US008872972B2

(12) United States Patent
Chang

(10) Patent No.: US 8,872,972 B2
(45) Date of Patent: Oct. 28, 2014

(54) SMART TELEVISION WITH A BUILT-IN ROUTER MODULE

(71) Applicant: Nai-Chien Chang, New Taipei (TW)

(72) Inventor: Nai-Chien Chang, New Taipei (TW)

(*) Notice: Subject to any disclaimer, the term of this patent is extended or adjusted under 35 U.S.C. 154(b) by 42 days.

(21) Appl. No.: 13/678,204

(22) Filed: Nov. 15, 2012

(65) Prior Publication Data
US 2013/0141644 A1 Jun. 6, 2013

(30) Foreign Application Priority Data
Dec. 6, 2011 (TW) .............................. 100223018 A

(51) Int. Cl.
H04N 7/00 (2011.01)
H04N 11/00 (2006.01)
H04N 5/445 (2011.01)
H04N 21/426 (2011.01)
H04N 21/436 (2011.01)
H04N 21/41 (2011.01)

(52) U.S. Cl.
CPC ............. *H04N 5/445* (2013.01); *H04N 21/426* (2013.01); *H04N 21/43615* (2013.01); *H04N 21/4113* (2013.01)
USPC ........... 348/552; 348/553; 348/563; 348/567; 348/569; 348/570; 348/719; 348/725; 348/723; 348/730; 348/734; 348/409.1; 348/372; 348/333.01; 348/211.2; 348/211.3; 348/192; 348/126; 348/87; 348/14.02; 307/10.4; 307/18; 307/24; 307/25; 307/28; 307/125; 307/126; 307/129; 307/130; 307/131; 307/400; 307/401; 370/252; 370/352; 370/386; 370/401; 455/13.3; 455/14; 455/82; 455/95; 455/121; 455/562.1; 455/575.7; 725/111; 725/112; 725/117; 725/118; 725/123; 725/130

(58) Field of Classification Search
USPC ........... 348/552, 730, 734, 719, 725, 333.01, 348/192, 553, 563, 567, 569, 570, 409.1, 348/372, 14.02, 211.2, 211.3, 126; 725/111, 112, 117, 118, 123, 130; 307/10.4, 18, 401, 24, 25, 28, 125, 307/126, 129, 130, 131, 400; 370/401, 252, 370/352, 386; 455/13.3, 14, 82, 95, 121, 455/562.1, 575.7
See application file for complete search history.

(56) References Cited

U.S. PATENT DOCUMENTS

| 8,649,762 | B1 * | 2/2014 | Miller et al. .................. 455/407 |
|---|---|---|---|
| 2003/0085621 | A1 * | 5/2003 | Potega ............................. 307/18 |
| 2005/0125559 | A1 * | 6/2005 | Mutha ............................ 709/245 |
| 2007/0113260 | A1 * | 5/2007 | Pua et al. ....................... 725/134 |
| 2008/0243391 | A1 * | 10/2008 | Ohshiro et al. .................... 702/2 |
| 2008/0284842 | A1 * | 11/2008 | Hu ................................. 348/46 |
| 2011/0169342 | A1 * | 7/2011 | Tinaphong et al. ............ 307/126 |
| 2011/0202195 | A1 * | 8/2011 | Finch et al. .................... 700/295 |
| 2011/0202270 | A1 * | 8/2011 | Sharma et al. ................. 701/201 |
| 2011/0211584 | A1 * | 9/2011 | Mahmoud ..................... 370/401 |
| 2011/0213681 | A1 * | 9/2011 | Shahid ......................... 705/27.1 |

* cited by examiner

Primary Examiner — Jefferey Harold
Assistant Examiner — Mustafizur Rahman
(74) Attorney, Agent, or Firm — Muncy, Geissler, Olds & Lowe, P.C.

(57) ABSTRACT

A router module is arranged in a housing of a smart television. The router module is externally connected to a modem for surfing the Internet. The router module is electrically connected to a micro processing unit of the smart television. Therefore, the smart television is connected to the Internet through the router module. A wireless transmission chip of the router module is configured to process Internet signals. An antenna module is configured to wirelessly transmit the Internet signals, so that wireless network is shared to outside.

9 Claims, 5 Drawing Sheets

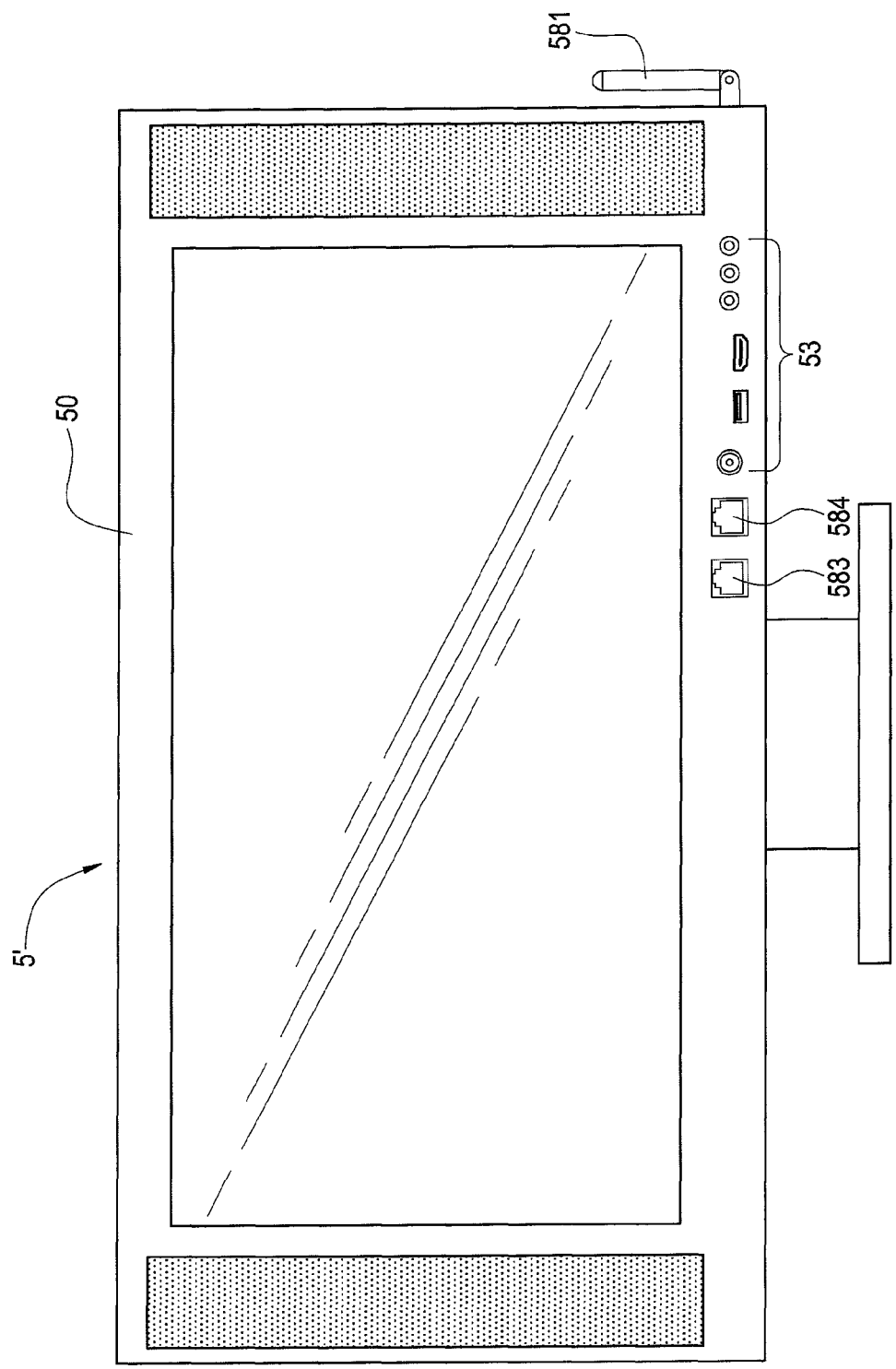

SMART TELEVISION WITH A BUILT-IN ROUTER MODULE

This application is based on and claims the benefit of Taiwan Application No. 100223018 filed Dec. 6, 2011 the entire disclosure of which is incorporated by reference herein.

BACKGROUND OF THE INVENTION

1. Field of the Invention

The present invention relates to a smart television, and especially relates to a smart television with a built-in router module.

2. Description of the Related Art

In the modern times, the technology is progressing every day. Many electronic devices with network function are available.

The user had to use a computer if the user wanted to surf the Internet in the past time. However, now many electronic devices (for examples, a smart phone or a Tablet PC) have network function. It is more convenient than before. FIG. 1 shows an application diagram of a related art smart television. A related art smart television 4 is connected to the Internet and is configured to download video or audio data then displaying on the monitor, so the DVD player or USB flash memory is not required anymore. Moreover, digital television signals would be received through the network cable, so the traditional coaxial cable is not required anymore, either.

A modem 1 is connected to the ISP. An electronic device 2 (for example, a computer) is connected to the Internet (network) through the modem 1 with a network line. A wireless router 3 (or an Access Point, AP) is connected to the Internet (network) through the modem 1 with a network line. Other electronic devices (not shown in FIG. 1) may wirelessly connect to the Internet (network) through the wireless router 3.

The related art smart television 4 is connected to the Internet through the modem 1 as well. However, more network lines are required if more electronic devices, such as the electronic device 2 or the wireless router 3, are connected to the modem 1. Moreover, the wireless router 3 has to be used if the user wants to reduce the network lines for other electronic devices. However, the wireless router 3 costs budget. The location for arranging the wireless router 3 is also troublesome.

SUMMARY OF THE INVENTION

In order to solve the above-mentioned problems, an object of the present invention is to provide a smart television with a built-in router module. The smart television is connected to the Internet (network) through a router module which is built in the smart television. Other electronic devices may wirelessly connect to the Internet (network) through the smart television.

In order to achieve the object of the present invention mentioned above, the router module is arranged in a housing of the smart television. The router module is externally connected to a modem and is configured to surf the Internet. The router module is electrically connected to a micro processing unit of the smart television. Therefore, the smart television is connected to the Internet through the router module. A wireless transmission chip of the router module is configured to process Internet signals. An antenna module is configured to wirelessly transmit the Internet signals, so that wireless network is shared to outside.

The efficiency of the present invention is that the smart television is directly connected to an external modem and is configured to surf the Internet. The smart television is configured to share wireless network to outside through the router module of the smart television. Therefore, the smart television is used as a wireless router. The space is saved and the network lines are reduced.

BRIEF DESCRIPTION OF DRAWING

FIG. 5 shows a rear view of the third embodiment of the smart television of the present invention.

DETAILED DESCRIPTION OF THE INVENTION

Figure 1:
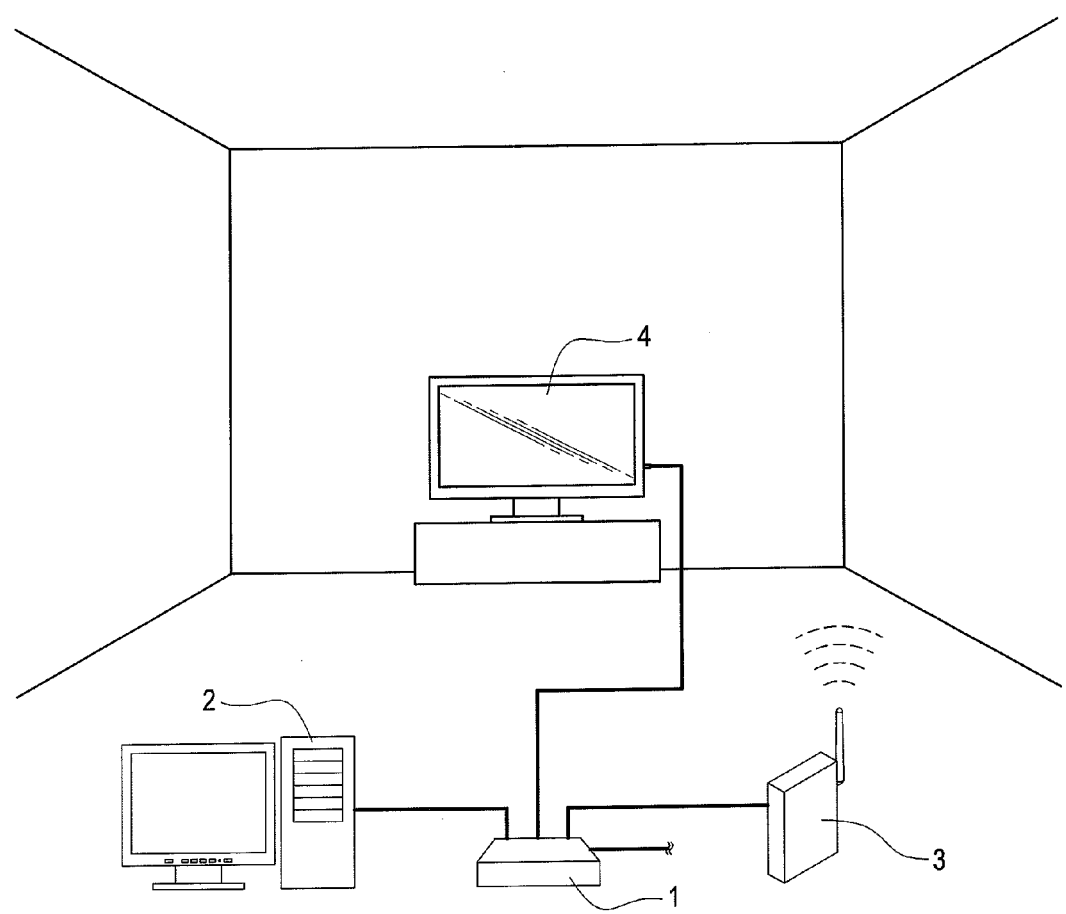
FIG. 1 shows an application diagram of a related art smart television.
Figure 2:
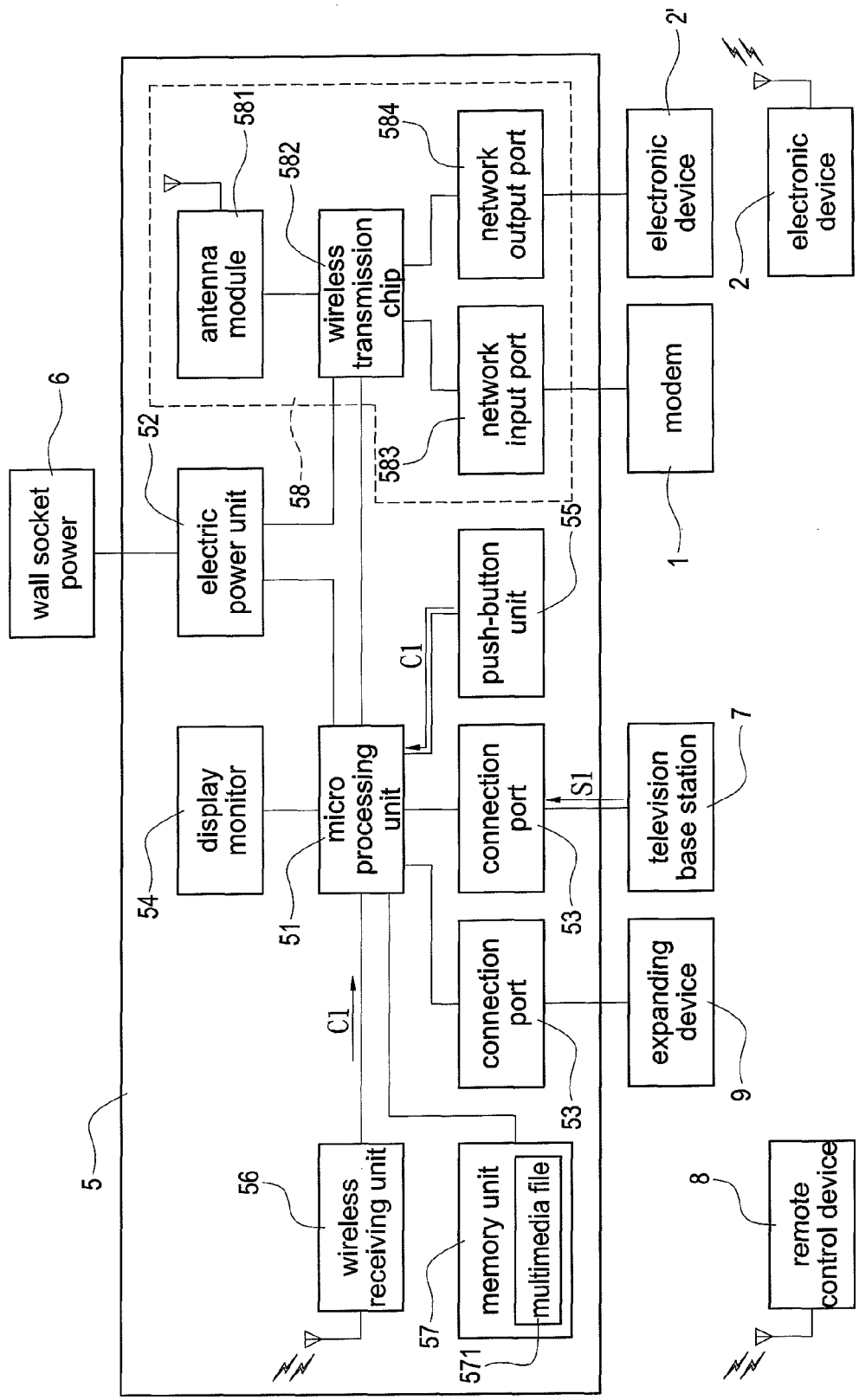
FIG. 2 shows a block diagram of the smart television of the present invention.

FIG. 2 shows a block diagram of the smart television of the present invention. A smart television 5 includes a router module 58. The smart television 5 is connected to the Internet (network) through the router module 58. Moreover, Internet (network) signals are processed by the router module 58 after the Internet (network) signals are received by the router module 58. The Internet (network) signals are sent out after the Internet (network) signals are processed by the router module 58. Therefore, wireless network is shared. The smart television 5 is used as a wireless router (or an Access Point, AP).

The smart television 5 includes a micro processing unit 51, an electric power unit 52, at least a connection port 53, a display monitor 54, a push-button unit 55, a wireless receiving unit 56, a memory unit 57 and the router module 58.

The electric power unit 52 is electrically connected to the micro processing unit 51. The smart television 5 is electrically connected to an external wall socket power 6 through the electric power unit 52. The smart television 5 receives electric power from the wall socket power 6. The electric power unit 52 is, for example but not limited to, a power line or a transformer. The connection port 53 is electrically connected to the micro processing unit 51. The connection port 53 is, for example but not limited to, a cable connector for connecting to a television base station 7 through a coaxial cable (not shown in FIG. 2). A television signal S1 is sent from the television base station 7 to the connection port 53, then the television signal S1 is sent from the connection port 53 to the micro processing unit 51 for processing.

The display monitor 54 is electrically connected to the micro processing unit 51. After the television signal S1 is processed by the micro processing unit 51, the display monitor 54 is configured to receive and display the television signal S1. Moreover, the smart television 5 includes a speaker (not shown in FIG. 2). The speaker could be independent or integrated into the display monitor 54. The speaker is configured to play an audio of the television signal S1. The display monitor 54 is configured to display a video of the television signal S1.

The push-button unit 55 is electrically connected to the micro processing unit 51. The push-button unit 55 is, for example but not limited to, a concrete push-button, a touch button, or a switch button. The push-button unit 55 is controlled with a user's action and is configured to generate a control command C1. The user's action is, for example but not limited to, turning on the smart television 5, turning off the smart television 5, selecting channels, selecting files, switching signal sources, controlling audio etc. Therefore, different control commands C1 are generated accordingly. The push-button unit 55 is configured to generate the control command C1. The control command C1 is sent from the push-button unit 55 to the micro processing unit 51. The television signal S1 is processed by the micro processing unit 51 in accordance with the control command C1. For examples, selects channels, controls volume, or switches signal sources (for example, switching signal source from a coaxial cable to an AV input).

The wireless receiving unit 56 is electrically connected to the micro processing unit 51. The wireless receiving unit 56 is configured to wirelessly receive a control signal sent from an external remote control device 8. Therefore, the control command C1 is generated by the smart television 5 in accordance with the control signal received by the wireless receiving unit 56. The control command C1 is sent to the micro processing unit 51 for processing. The remote control device 8 is, for example, a remote control. The smart television 5 is wirelessly controlled by the user through the remote control device 8. The wireless receiving unit 56 is, for example but not limited to, an infrared transmission unit or a Bluetooth transmission unit. Accordingly, the wireless receiving unit 56 includes an infrared transmission interface or a Bluetooth transmission interface for transmitting the control signal.

The memory unit 57 is electrically connected to the micro processing unit 51. The memory unit 57 is, for example but not limited to, a built-in hard disk or memory of the smart television 5. The memory unit 57 is configured to memorize at least a multimedia file 571. The smart television 5 is controlled by the user through the push-button unit 55 or the remote control device 8 to generate the control command C1. The micro processing unit 51 is configured to select, read or execute the multimedia file 571 in the memory unit 57 in accordance with the control command C1. Moreover, the multimedia file 571 is displayed on the display monitor 54 of the smart television 5.

As mentioned above, the smart television 5 is configured to receive the television signal S1 through the coaxial cable and display the television signal S1. The smart television 5 is configured to display the multimedia file 571 memorized in the memory unit 57 as well.

The connection port 53 is, for example but not limited to, a universal serial bus (USB) connector, a high definition multimedia interface (HDMI) connector, or an AV input. Therefore, the smart television 5 is electrically connected to an external expanding device 9 (for example, a USB flash memory) through the USB and is configured to receive, read, and execute a multimedia file (not shown in FIG. 2) memorized in the USB flash memory then displaying on the display monitor 54.

The smart television 5 is electrically connected to the external expanding device 9 (for example, a DVD player or a Blu-ray player) through the HDMI or the AV input for receiving a multimedia file (not shown in FIG. 2) played in the expanding device 9 then displaying on the display monitor 54.

The router module 58 is electrically connected to the wall socket power 6 through the electric power unit 52 and receives electric power. Therefore, the router module 58 does not need extra electric power. The router module 58 is electrically connected to an external modem 1 for connecting to the Internet (network). The router module 58 is electrically connected to the micro processing unit 51 and is configured to send Internet (network) signals to the micro processing unit 51. Therefore, the micro processing unit 51 is electrically connected to the modem 1 through the router module 58 for connecting to the Internet (network).

The router module 58 is built in the smart television 5 and is electrically connected to the modem 1 for connecting to the Internet (network). Moreover, the smart television 5 (with the router module 58) could be used as a wireless router after the smart television 5 is electrically connected to the modem 1.

Figure 3:
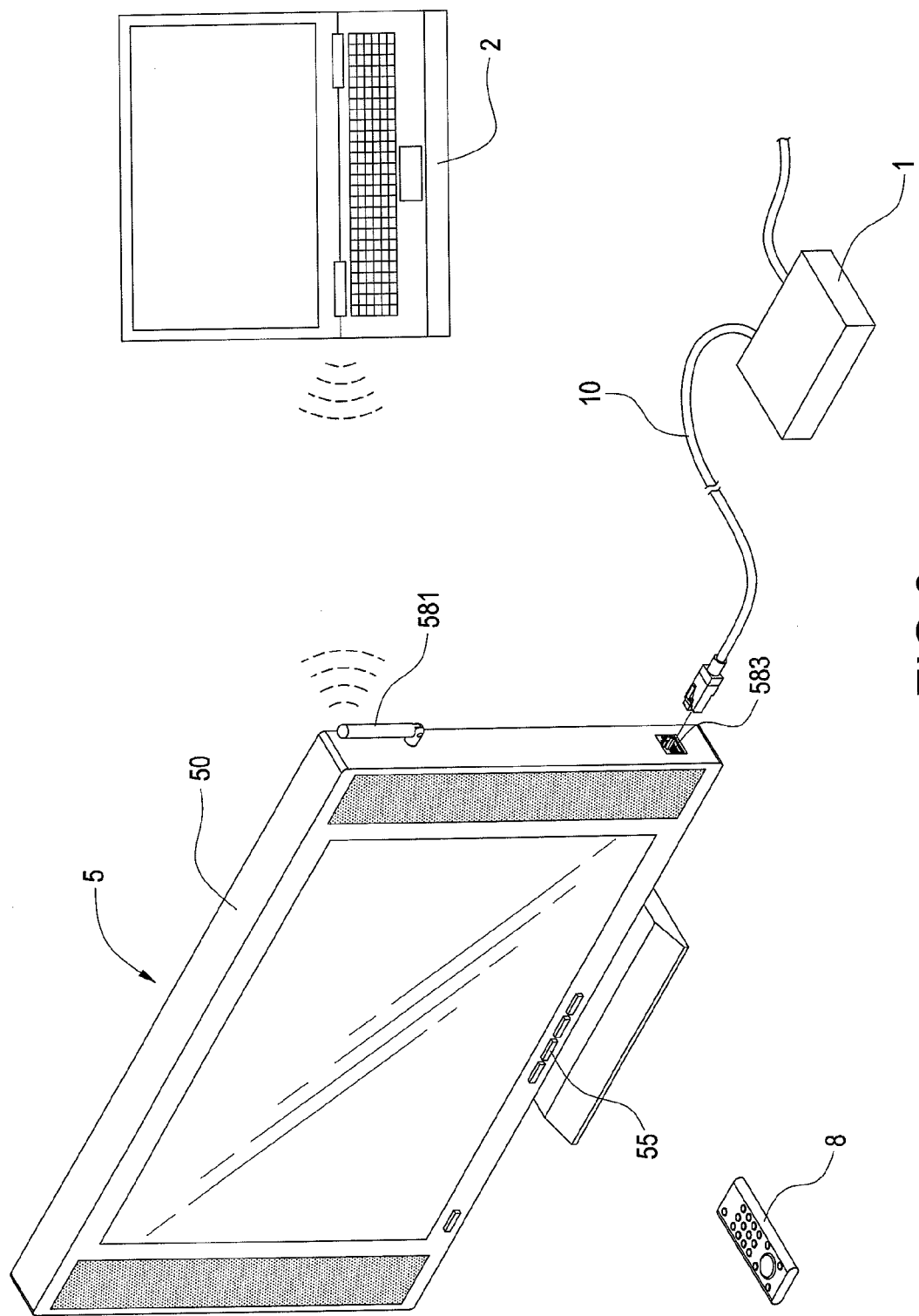
FIG. 3 shows an application diagram of the first embodiment of the smart television of the present invention.

FIG. 3 shows an application diagram of the first embodiment of the smart television of the present invention. Please refer to FIG. 2 as well. The router module 58 includes an antenna module 581, a wireless transmission chip 582, and a wireless network input port 583. The wireless transmission chip 582 is electrically connected to the micro processing unit 51, the electric power unit 52, the antenna module 581, and the network input port 583.

The network input port 583 is connected to the modem 1 through a network line 10. The router module 58 is connected to the modem 1 through the network input port 583 for connecting to the Internet (network). The Internet (network) signals are received by the wireless transmission chip 582 through the network input port 583. The wireless transmission chip 582 is configured to process the network signals then send the network signals to the micro processing unit 51. Therefore, the smart television 5 is connected to the Internet (network) through the router module 58. Moreover, the Internet (network) signals processed by the wireless transmission chip 582 are sent to the antenna module 581 for wirelessly sending out for sharing the wireless network.

An electronic device 2 (for example, a computer with a wireless transmission interface) is wirelessly connected to the router module 58 through the antenna module 581 for wirelessly connecting to the Internet (network). The wireless transmission chip 582 is, for example but not limited to, a Wireless Fidelity (Wi-Fi) transmission chip. The router module 58 is configured to transmit and process the Wi-Fi signals. The network input port 583 is, for example but not limited to, an RJ-45 connector.

The user can control the smart television 5 by using the push-button unit 55 or the remote control device 8. Moreover, the smart television 5 is connected to the Internet (network) through the modem 1. The smart television 5 is configured to share wireless network through the antenna module 581. The smart television 5 can be used as a wireless router. Therefore, the electronic device 2 is connected to the Internet (network) through the smart television 5.

Figure 4:
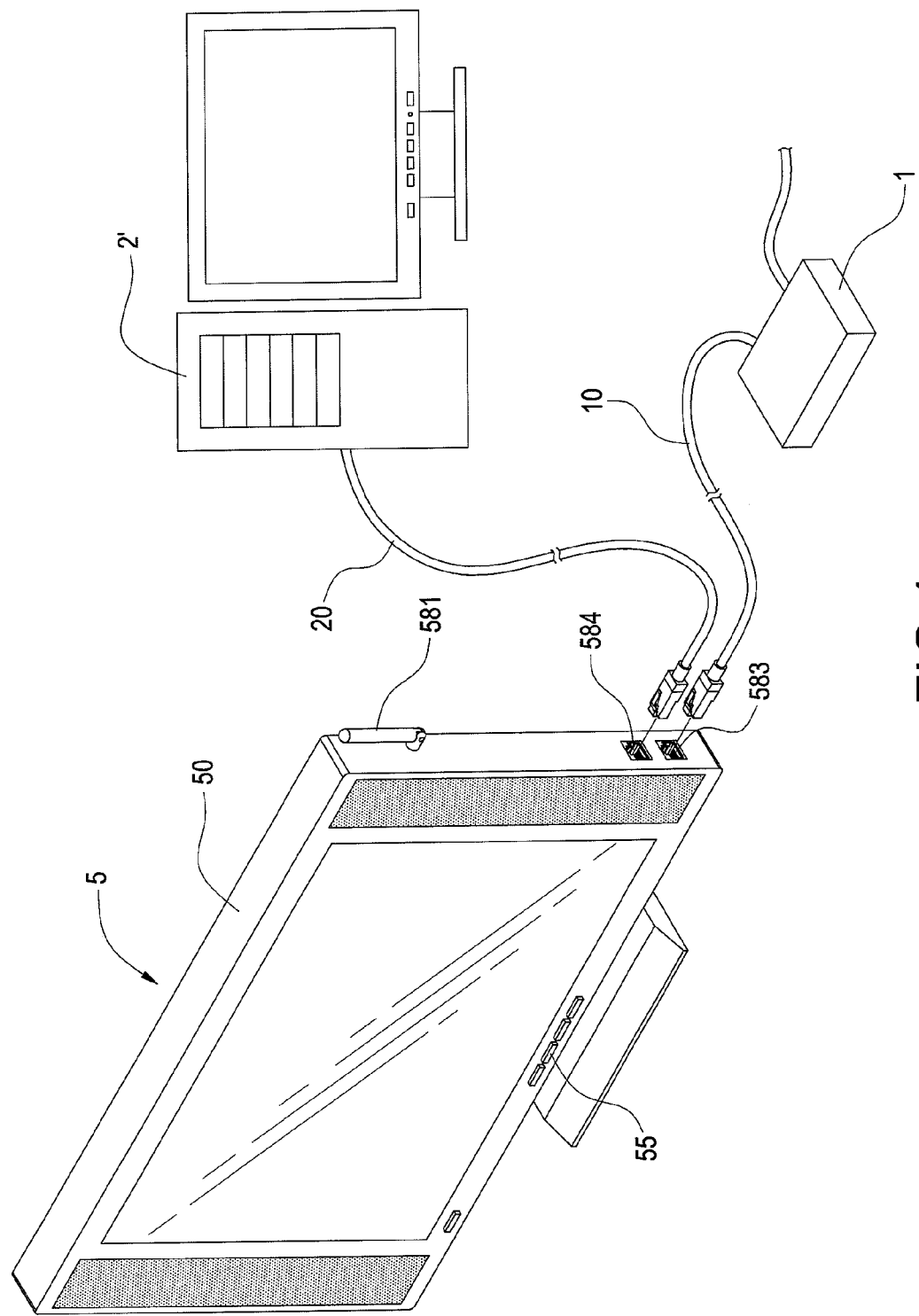
FIG. 4 shows an application diagram of the second embodiment of the smart television of the present invention.

FIG. 4 shows an application diagram of the second embodiment of the smart television of the present invention. Please refer to FIG. 2 as well. The router module 58 further includes a network output port 584 electrically connected to the wireless transmission chip 582. The network output port 584 is electrically connected to an electronic device 2' through a network line 20. Therefore, the electronic device 2' is connected to the Internet (network) through the router module 58 with the network line 20. The network output port 584 is, for example but not limited to, an RJ-45 connector.

The smart television 5 is connected to the modem 1 through the network input port 583 for connecting to the Internet (network). The use can control the smart television 5 by using the push-button unit 55, the remote control device 8, or any other control devices (for examples, a wireless keyboard or a wireless mouse) and is configured to surf the Internet. The multimedia data in the Internet are received and displayed by the smart television 5.

Moreover, the smart television 5 is configured to share the wireless network through the antenna module 581. The electronic device 2 is wirelessly connected to the Internet (network) through the smart television 5. Moreover, the smart television 5 is connected to the electronic device 2' through the network output port 584 with the network line 20. Therefore, the electronic device 2' is connected to the Internet (network) through the smart television 5.

The smart television 5 further includes a housing 50 covering the micro processing unit 51, the electric power unit 52, the connection port 53, the display monitor 54, the push-button unit 55, the wireless receiving unit 56, the memory unit 57, the wireless transmission chip 582, the network input port 583, and the network output port 584. Moreover, the connection port 53, the push-button unit 55, the network input port 583, and the network output port 584 are not completely covered by the housing 50. The antenna module 581 is, for example but not limited to, arranged outside the housing 50 to receive stronger signals.

FIG. 5 shows a rear view of the third embodiment of the smart television of the present invention. A smart television 5' includes a housing 50. A connection port 53, a network input port 583, and a network output port 584 are, for example but not limited to, arranged in front of the housing 50.

The connection port 53 is, for example, a cable connector, an AV input, a USB connector, or an HDMI connector. The smart television 5' is connected to the expanding device 9 (as shown in FIG. 2) and is configured to transmit signals. The network input port 583 and the network output port 584 are, for examples but not limited to, RJ-45 connectors.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A smart television including:
   an electric power unit electrically connected to a wall socket power and receiving an electric power from the wall socket power;
   a micro processing unit electrically connected to the electric power unit;
   at least a connection port electrically connected to the micro processing unit, the connection port receiving television signal sent from a television base station through a coaxial cable, the micro processing unit configured to process the television signal;
   a display monitor electrically connected to the micro processing unit, the display monitor configured to display the television signal after the television signal is processed by the micro processing unit;
   at least a push-button unit electrically connected to the micro processing unit, the push-button unit controlled by an external operation to generate a control command, the micro processing unit configured to process the television signal in accordance with the control command; and
   a router module electrically connected to the electric power unit and the micro processing unit, the router module electrically connected to the wall socket power through the electric power unit and receiving the electric power, the router module configured to send network signals to the micro processing unit, the smart television connected to a network through the router module,
   wherein the router module is configured to process the network signals and send out the network signals for sharing the wireless network; and
   wherein the router module includes:
   a network input port electrically connected to an external modem for connecting to the network;
   a wireless transmission chip electrically connected to the network input port, the electric power unit, and the micro processing unit, the wireless transmission chip receiving the network signals, the wireless transmission chip configured to process the network signals and transmit the network signals to the micro processing unit; and
   an antenna module electrically connected to the wireless transmission chip, the antenna module receiving the network signals after the network signals is processed by the wireless transmission chip, the antenna module configured to send out the network signals for sharing wireless network.

2. The smart television in claim 1, wherein the wireless transmission chip is a wireless fidelity transmission chip.

3. The smart television in claim 1, wherein the router module further includes:
   a network output port electrically connected to the wireless transmission chip, the network output port electrically connected to an electronic device with a network line for connecting to the network.

4. The smart television in claim 3, wherein the network input port and the network output port are RJ-45 connectors.

5. The smart television in claim 3, further including:
   a housing covering the electric power unit, the micro processing unit, the connection port, the display monitor, the push-button unit, the wireless transmission chip, the network input port, and the network output port,
   wherein at least one of the connection port, the push-button unit, the network input port, and the network output port is exposed out of the housing; the antenna module is arranged outside the housing.

6. The smart television in claim 1, further including:
   a wireless receiving unit electrically connected to the micro processing unit, the smart television receiving a control signal through the wireless receiving unit, the smart television configured to generate the control command.

7. The smart television in claim 6, wherein the wireless receiving unit is an infrared transmission unit or a Bluetooth transmission unit.

8. The smart television in claim 1, further including:
   a memory unit electrically connected to the micro processing unit, the memory unit configured to memorize at least a multimedia file, the micro processing unit configured to read and execute the multimedia file in accordance with the control command, the display monitor configured to display the multimedia file.

9. The smart television in claim 1, wherein the connection port is a universal serial bus connector, a high definition multimedia interface (HDMI) connector, or an AV input.

* * * * *